US012741236B2

(12) United States Patent
Canonico et al.

(10) Patent No.: US 12,741,236 B2
(45) Date of Patent: Sep. 22, 2026

(54) HIGH-PERFORMANCE FABRIC FOR WATER/DIESEL SEPARATING FILTERS

(71) Applicant: SAATI S.p.A., Appiano Gentile (IT)

(72) Inventors: Paolo Canonico, Appiano Gentile (IT); Carmine Lucignano, Appiano Gentile (IT); Roberto Momentè, Appiano Gentile (IT)

(73) Assignee: SAATI S.p.A., Appiano Gentile (IT)

( * ) Notice: Subject to any disclaimer, the term of this patent is extended or adjusted under 35 U.S.C. 154(b) by 1045 days.

(21) Appl. No.: 17/287,912

(22) PCT Filed: Nov. 29, 2019

(86) PCT No.: PCT/IB2019/060308
§ 371 (c)(1),
(2) Date: Apr. 22, 2021

(87) PCT Pub. No.: WO2020/115625
PCT Pub. Date: Jun. 11, 2020

(65) Prior Publication Data

US 2021/0394085 A1 Dec. 23, 2021

(30) Foreign Application Priority Data

Dec. 3, 2018 (IT) ........................ 102018000010762

(51) Int. Cl.
*B01D 17/04* (2006.01)
*B01D 39/08* (2006.01)
(Continued)

(52) U.S. Cl.
CPC ........... *B01D 17/04* (2013.01); *B01D 39/083* (2013.01); *B01D 39/086* (2013.01);
(Continued)

(58) Field of Classification Search
CPC .... B01D 17/04; B01D 39/083; B01D 39/086; B01D 2239/0421; B01D 2239/1233;
(Continued)

(56) References Cited

U.S. PATENT DOCUMENTS 3,506,127 A * 4/1970 Gammon ............ B01D 35/005
210/300
5,256,291 A * 10/1993 Cagle ..................... B01D 39/12
210/507
(Continued)

FOREIGN PATENT DOCUMENTS

JP H10-118430 A * 5/1998
WO 2018108700 A1 6/2018

OTHER PUBLICATIONS

Zhang et al., Journal of Dispersion Science and Technology, 36:182-189, 2015 (Year: 2015).*
(Continued)

*Primary Examiner* — Pranav N Patel
(74) *Attorney, Agent, or Firm* — Greer Burns & Crain Ltd.

(57) ABSTRACT

A fabric for use in filters separating water from a water/diesel emulsion, and a method of using such a fabric, where the fabric has a rectangular mesh, the sides of which are formed by respective threads. In comparison with prior art fabrics for water/diesel filters, the fabric of the invention offers the advantage of having a higher separation efficiency, thus allowing separation of diesel with a lower residual water content downstream of the filter.

20 Claims, 14 Drawing Sheets

(51) Int. Cl.
*D03D 15/225* (2021.01)
*D03D 15/25* (2021.01)
*D03D 15/283* (2021.01)
*D03D 15/527* (2021.01)

(52) U.S. Cl.
CPC .......... *D03D 15/225* (2021.01); *D03D 15/25* (2021.01); *D03D 15/283* (2021.01); *D03D 15/527* (2021.01); *B01D 2239/0421* (2013.01); *B01D 2239/1233* (2013.01); *B01D 2257/80* (2013.01); *D10B 2101/20* (2013.01); *D10B 2201/24* (2013.01); *D10B 2321/00* (2013.01); *D10B 2331/00* (2013.01); *D10B 2401/021* (2013.01); *D10B 2505/04* (2013.01)

(58) Field of Classification Search
CPC .......... B01D 2257/80; B01D 2239/069; B01D 2239/1216; D03D 15/225; D03D 15/25; D03D 15/283; D03D 15/527; D10B 2101/20; D10B 2201/24; D10B 2321/00; D10B 2331/00; D10B 2401/021; D10B 2505/04
See application file for complete search history.

(56) References Cited

U.S. PATENT DOCUMENTS

| | | | | |
|---|---|---|---|---|
| 5,944,197 | A * | 8/1999 | Baltzer | B07B 1/4672<br>209/400 |
| 2002/0023883 | A1 | 2/2002 | Adams et al. | |
| 2014/0034580 | A1* | 2/2014 | Chen | F16N 39/06<br>210/708 |
| 2017/0203235 | A1* | 7/2017 | Fleischhaker | C23C 30/005 |

OTHER PUBLICATIONS

English language machine translation of JPH10-118430A, 8 pages, No Date.*

Plaka, Theophano, International Search Report from the European Patent Office in PCT/IB2019/060308, mailed Jan. 30, 2020.

* cited by examiner

HIGH-PERFORMANCE FABRIC FOR WATER/DIESEL SEPARATING FILTERS

BACKGROUND OF THE INVENTION

The present invention concerns a high-performance fabric that can be used in diesel fuel filters to perform the function of separating water from a water/diesel emulsion.

It is known that diesel, for example diesel fuel for motor-vehicles, has a water content in emulsion which is harmful for the working life of the injection systems and for the engine efficiency. It is therefore necessary to separate the aqueous fraction from the diesel entering the injection system.

For said purpose it is known to use filters which comprise a square mesh fabric, the size of which is chosen so as to stop water drops. The filter is typically formed by two or three filtering media with different functions; the fabric subject of this invention occupies the last filtering stage. The first filtering medium is typically a non-woven fabric or paper that performs the function of filtering solid particulate. The second filtering medium is also composed of similar materials appropriately surface-treated or produced using specific materials in such a way as to obtain a coalescence effect of the water droplets dispersed in the diesel, in order to simplify the subsequent blocking of said drops. In both cases, typically inexpensive materials are used, produced with a random distribution of fibrous materials and random distribution of pores. After the coalescence stage, the larger drops, due to the weight difference, will precipitate onto the bottom of the filter where they are then drained off, whereas the smaller drops will continue their flow. In order to prevent these drops from coming into contact with delicate components of the hydraulic-mechanical circuit of the vehicle, they are blocked by means of the fabric subject of this invention, which represents the third filtering stage. In this case, unlike the two preceding stages, the use of a precision filtering medium is preferred with pore (mesh) size uniform in space and time in order to be reasonably certain that all the drops with larger size than the characteristic size of the mesh openings (all identical to one another) will be blocked. For this reason, synthetic precision fabrics, made of a suitable polymer, appropriately treated and having square mesh represent the ideal medium for this type of application.

The problem of separating water from diesel fuel is becoming increasingly critical for two reasons:

1. Use of substances in biodiesel that stabilize the emulsion.
2. Use of pumps which, to achieve increasingly high engine performances, shatter the water drops reducing the size thereof is and therefore making it more difficult to block them.

For the purpose of increasing the separation efficiency of the filter, defined as percentage of water stopped by the fabric in relation to the total amount of water present in the water/diesel emulsion that reaches the filter, it is known to reduce the length of the side of the square mesh of the fabric used, thus obtaining a fabric with an increasingly small mesh. Said practice must obviously be calibrated according to the size of the water drops entering the fabric filtering medium.

There are two possible ways of reducing the mesh size. The first is to insert an increasing number of fabric threads, maintaining the same diameter. The second entails using the same number of threads but with a larger thread diameter. It is evident that in both cases the empty-to-full ratio decreases. Therefore, in order to obtain a smaller mesh size while keeping the empty-to-full ratio constant, one would obviously think that the only solution is to use an increasing number of threads with, at the same time, increasingly small thread diameter. However, this seemingly ideal third method has two limitations:

- a technological limitation in the thread processing phase, since below a certain diameter it is not possible to extrude the monofilament or weave it;
- a technological limitation in the weaving phase, since it is not possible to increase the number of threads/cm beyond a certain threshold: by using a smaller thread diameter it is impossible to obtain a particularly small mesh size. Beyond a certain threshold, a reduction in the free (empty-to-full) surface is therefore inevitable.

The traditional practice cited, namely that of reducing the mesh size, based on the above description has the drawback of reducing also the free surface of the mesh. In fact, when the prior art square mesh is too small or narrow, the pressure of the fluid in the section upstream of the filter or diesel delivery section increases due to the obstruction of the mesh is surface by the body or footprint of the drop retained on the latter. A pressure increase of this type on the diesel delivery area is able to deform the water drop, pushing it until it is able to pass through the mesh, thus reducing the separation efficiency of the filter.

The presence of narrow mesh furthermore has the drawback of lowering the flow rate of filtered diesel towards the engine, thus reducing the efficiency thereof.

Therefore, in some cases the benefit of the reduction in the mesh size could be invalidated by the parallel reduction in the free surface.

SUMMARY OF THE INVENTION

The main object of the present invention is to provide a high-performance fabric for water/diesel separating filters which, unlike the known fabrics, has a better water/diesel separation efficiency.

A further object of the invention is to provide a fabric of the aforementioned type which, while having a high separation efficiency, is not an obstacle to the desired passage of diesel through the fabric, thus avoiding excessively lowering the fuel flow rate or considerably increasing the pressure drops.

These and other objects are achieved with the fabric described herein.

Compared to the prior art fabrics for water/diesel filters, the fabric according to the invention offers the advantage of having a higher separation efficiency, thus allowing separation of diesel with lower residual water content downstream of the filter.

A further advantage of the fabric according to the invention is that, while presenting a high separation efficiency, it does not unduly reduce the diesel flow rate and therefore does not compromise the engine efficiency.

BRIEF DESCRIPTION OF THE DRAWINGS

These and other objects, advantages and characteristics are illustrated in the following description of some preferred embodiments of the fabric according to the invention, shown by way of non-limiting example in the figures of the attached drawings, wherein.

DISCLOSURE OF THE PREFERRED EMBODIMENTS

Figure 1:
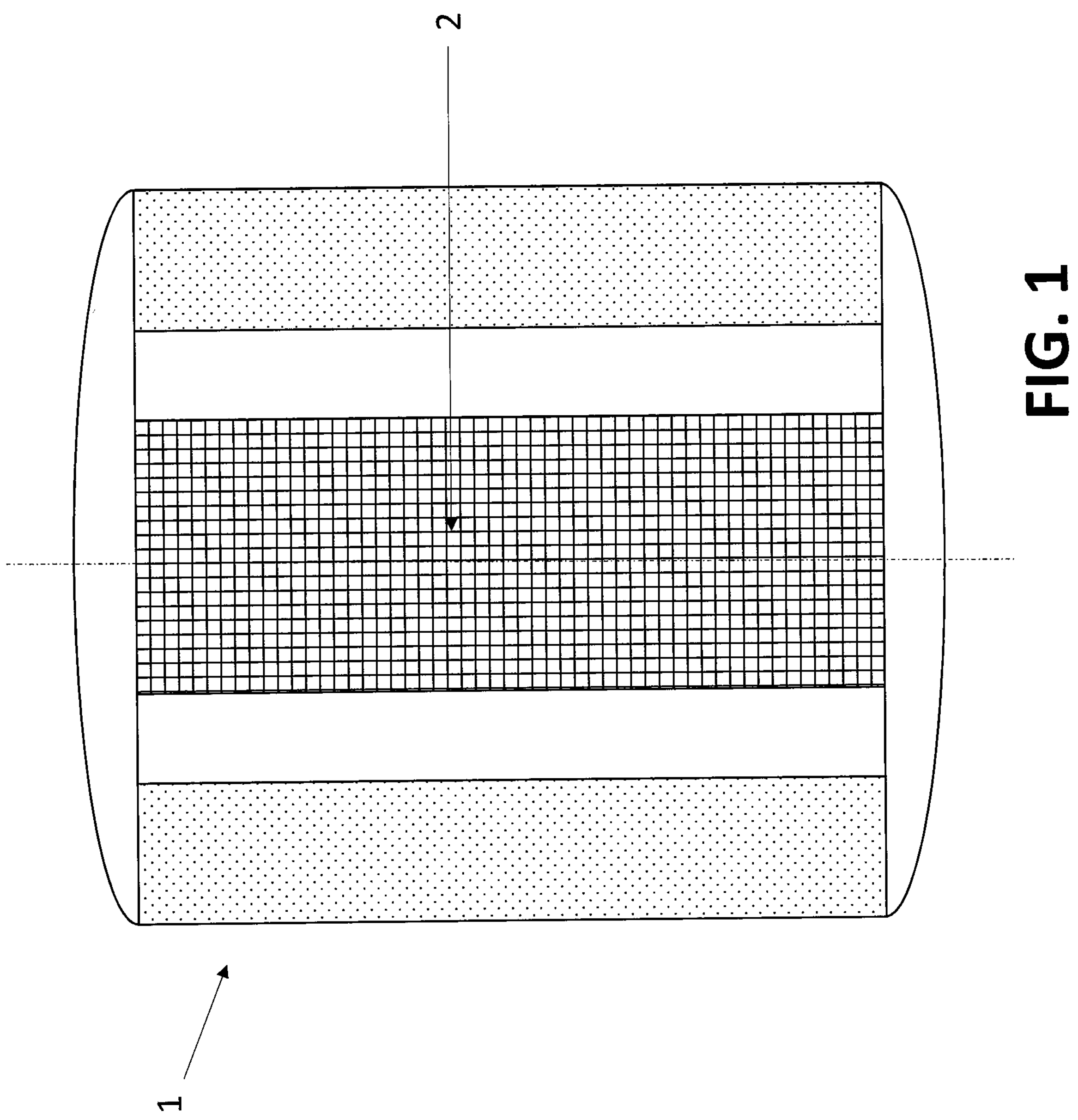
FIG. 1 illustrates a cross-section of a modern water/diesel separation filter, provided with the fabric according to the invention.

In the example shown in FIG. 1, a filter 1 for water/diesel separation is illustrated, provided with a body inside which a filtering fabric is 2 is housed.

Figure 2:
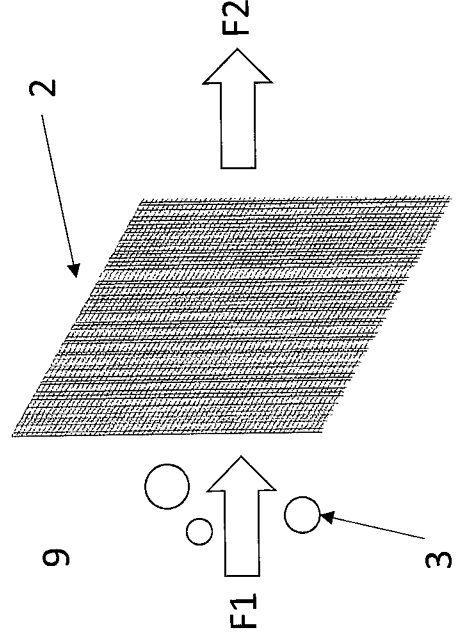
FIG. 2 is an operating diagram of the filter in FIG. 1.

In operation of the filter, as illustrated in FIG. 2, a diesel flow (arrow F1) is conveyed in the direction of the fabric 2, so as to obtain downstream a diesel flow F2, from which water drops 3 present in the upstream flow F1 have been filtered out.

Figure 3:
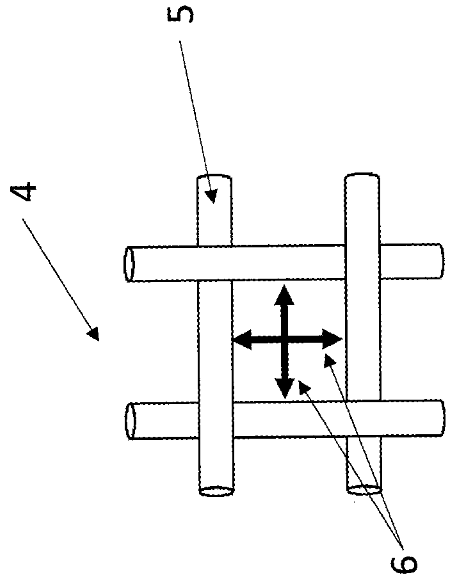
FIGS. 3, 4*a* and 4*b* illustrate the square mesh of a prior art fabric.
Figure 4A:
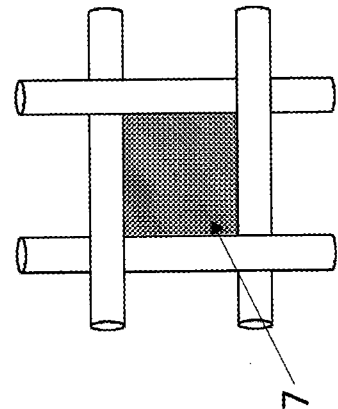
Figure 4B:
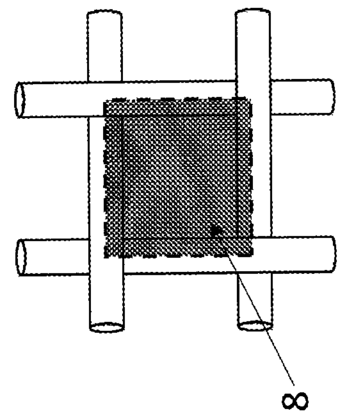

In the prior art illustrated in FIGS. 3 and 4*a* and 4*b*, the mesh 4 of the fabric 2 is square and is composed of threads 5 that form the respective sides 6 of the square mesh 4.

The free surface of said prior art mesh 4, illustrated in FIGS. 4*a* and 4*b*, is calculated as a percentage ratio between the surface of the smaller square 7, comprised between the profile or the inner edge of the threads 5 forming the sides 6 of the mesh 4, and the surface of the larger square 8, measured as far as the centre line of the thickness of said threads 5.

Figure 5:
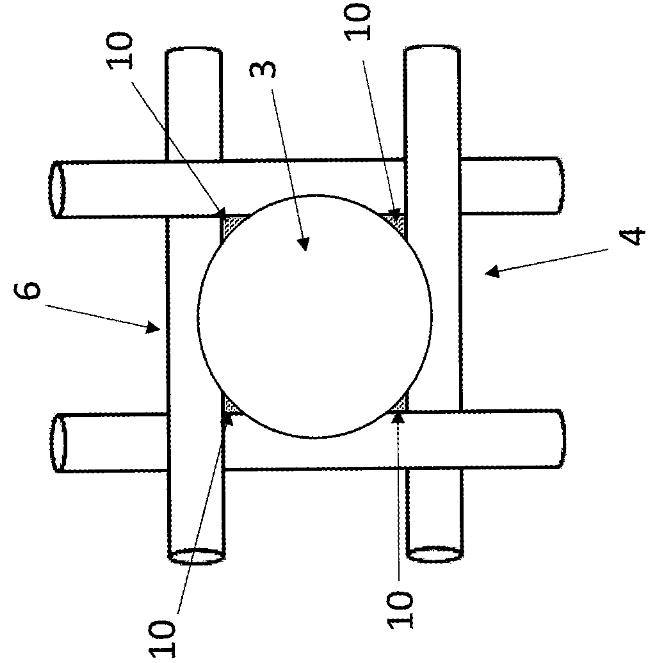
FIG. 5 illustrates the mesh of FIG. 3, when obstructed by a water drop.

When the prior art mesh 4 receives, from the diesel flow F1 to be filtered, a water drop 3 having a diameter comparable to the length of the side 6 of said square mesh, the opening of the latter is obstructed, leaving only small portions 10 of the surface of the smaller square 7 of the mesh 4 free for passage of the diesel flow (FIG. 5).

As a consequence of the described phenomenon, an increase in the pressure of the fluid could occur in the part upstream of the fabric 2 (arrow F1 of FIG. 2), capable of deforming the water drop 3, allowing it to pass through the mesh 4. In this way the fabric separation efficiency, calculated as the percentage of water blocked by the fabric in relation to the total amount of water present in the diesel delivered to the filter, is reduced in comparison to the design value of the filter.

In addition, the described obstruction of the prior art square mesh 4 increases the pressure losses on the filtering fabric, with consequent increase in the energy required to maintain the same diesel flow rate to the engine.

Figure 6:
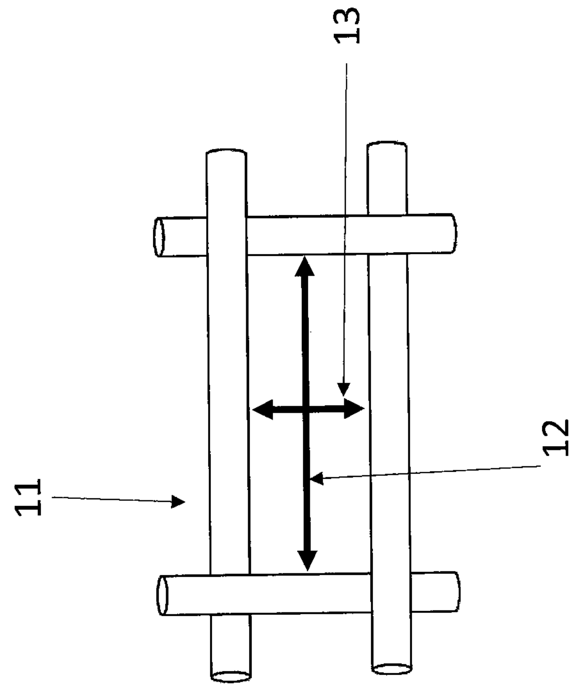
FIGS. 6, 7*a* and 7*b* illustrate the rectangular mesh of the fabric according to the invention.
Figure 7A:
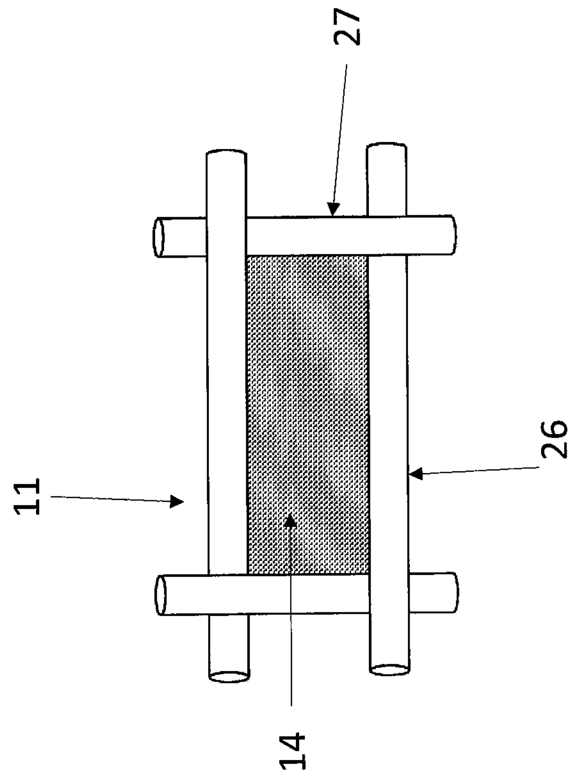
Figure 7B:
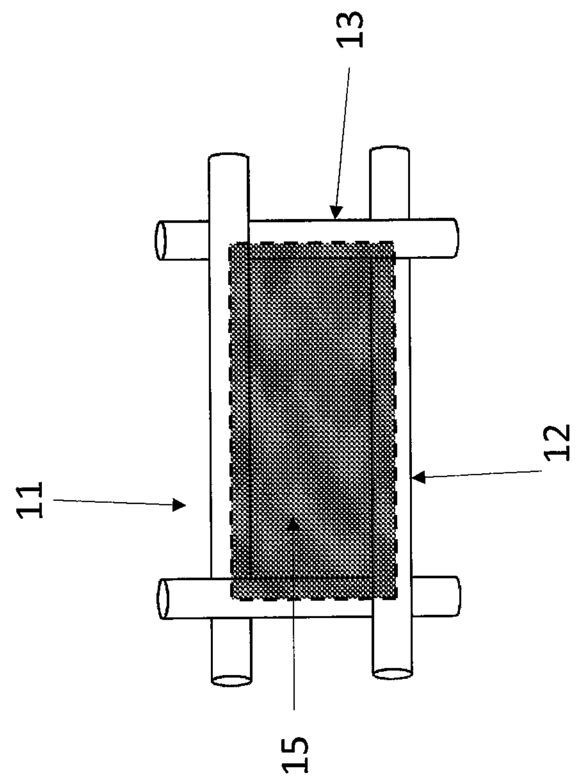

In order to overcome these drawbacks, the fabric 25 according to the invention has rectangular mesh 11, having a longer side 12 and a shorter side 13 (FIG. 6). The free surface of the mesh 11 is calculated as a percentage ratio between the surface of the smaller rectangle 14, measured between the profile or the edge of the threads 26,27 facing the inside of the mesh 11 and forming the respective sides thereof 12,13, and the surface of the larger rectangle 15, the latter measured as far as the centre-line of the thickness of the cited threads 26,27. The sides of the rectangular mesh of the fabric according to the invention are such that the ratio between the shorter side and the longer side is comprised between 0.38 and 1.

Preferably the fabric of the invention is obtained by weaving threads 26, 27 consisting of a synthetic monofilament or multifilament with diameter of 10-90 μm, in which the shorter side of the fabric mesh has a length varying from 5 to 150 μm.

According to the invention, said threads 26, 27 are made of a synthetic technopolymer belonging to the family of polyesters, polyamides, polyaryletherketones, polyparaphenylene sulfides, polypropylenes, perfluorocarbons, polyurethanes, or polyvinyl chlorides. Alternatively, said threads consist of an artificial polymer belonging to the cellulose or viscose family. The fabric of the invention can also be made of metal yarn.

Figure 8:
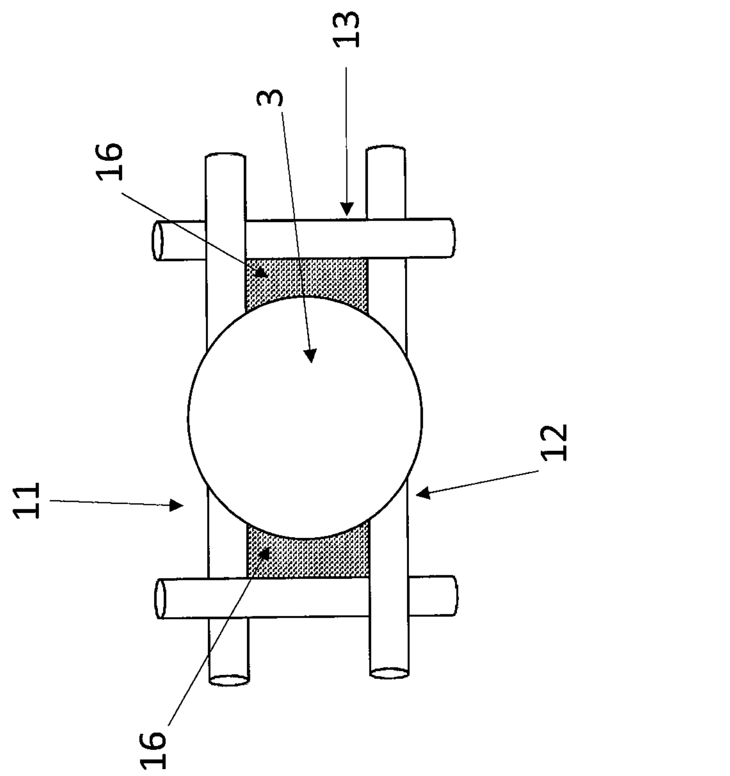
FIG. 8 illustrates the mesh of FIG. 6, when obstructed by a water drop.

When the mesh 11 of the fabric 25 according to the invention receives, from the diesel flow F1 to be filtered, a water drop 3 with diameter comparable to the length of the shorter side 13 of said rectangular mesh 11, the opening of the latter is not completely obstructed as in the case of the prior square mesh 4, but as the diesel flow passes through, large portions 16 of the free surface of said mesh 11 are left unobstructed (FIG. 8).

In this way the dual objective is achieved of retaining the water drop 3 on the mesh 11 while allowing the diesel flow to pass through the free is portions 16 thereof. This avoids pressure increases on the delivery F1 of the water/diesel emulsion which, when using the prior art fabric 2, are capable of pushing the drop 3 beyond the square mesh 4.

In order to provide greater separation efficiency, the fabric of the invention can be used as is or implemented with a fluorocarbon or silicone water-repellent and/or water-/oil-repellent treatment.

The threads 26, 27 forming the fabric of the invention have a diameter that varies from 10 μm to 90 μm in one or in both warp and weft directions. The fabric of the invention can furthermore be produced with a textile construction requiring a number of threads per cm that varies from 23 to 350.

The fabric can be produced by means of different textile architectures and using threads of different types or different diameters in weft and warp. The mesh opening of the fabric subject of the invention can have a short side ranging from 5 to 150 μm.

Thanks to the invention it is furthermore possible to produce rectangular mesh 11 with a shorter side 13 even shorter than the side 6 of the square mesh 4 of the prior art fabrics 2, thus further increasing the separation efficiency of the fabric 25 according to the invention. The smallest size of the rectangular mesh must obviously be such as not to allow the passage of any deformed drop. Analogously, the size of the longer side of the rectangle cannot be infinite since, obviously, once the drop has deformed it will tend to pass through the long side of the rectangular mesh. Therefore, the ratio 0.38-1 between the size of the shorter side 13 and that of the longer side 12 of the rectangle 11 is defined within the cited range, as a function of the filter operating parameters.

From the present description it can be seen that by adjusting the ratio of the longer and shorter sides of the rectangular mesh within said range, it is possible to obtain:

- a larger free surface in comparison with a square mesh, by fixing is the size of the shorter side of the rectangle equal to that of the side of the square; for example, having fixed a thread diameter of 24 μm, with a square having side of 18 μm, a free surface of 18% is obtained, whereas with a rectangle having sides 18×20 μm, the free surface is 20%;

a smaller size of the shorter side of the rectangle compared to that of the side of the square, with the same free surface; for example, having fixed a thread diameter of 24 μm, a square with free surface of 18% has sides of 18 μm, whereas a rectangle with free surface of 18% has sides of 16×20 μm;

a smaller size of the shorter side of the rectangle compared to that of the side of the square and even larger free surface; for example, having fixed a thread diameter of 24 μm, a square with free surface of 18% has sides of 18 μm, whereas a rectangle with free surface of 19% has sides of 16×22 μm.

According to the above, the separation efficiency is inversely proportional to the mesh size and directly proportional to the free surface. It follows that, by adjusting the rectangular mesh with a ratio, between longer and shorter sides, comprised between 0.38 and 1, it is possible to optimize the filter separation efficiency. For example, a rectangular mesh with sides of 23×25 μm (and therefore ratio 0.92) has a separation efficiency of 35% if tested with a specific flow rate of 3.33 l/h/$cm^2$ and drop size of 20 μm. On the other hand, a rectangular mesh with sides of 15×21 μm (and therefore ratio 0.7) has a separation efficiency of 48% if tested with a specific flow rate of 3.33 l/h/$cm^2$ and drop size of 20 μm.

Figure 9:
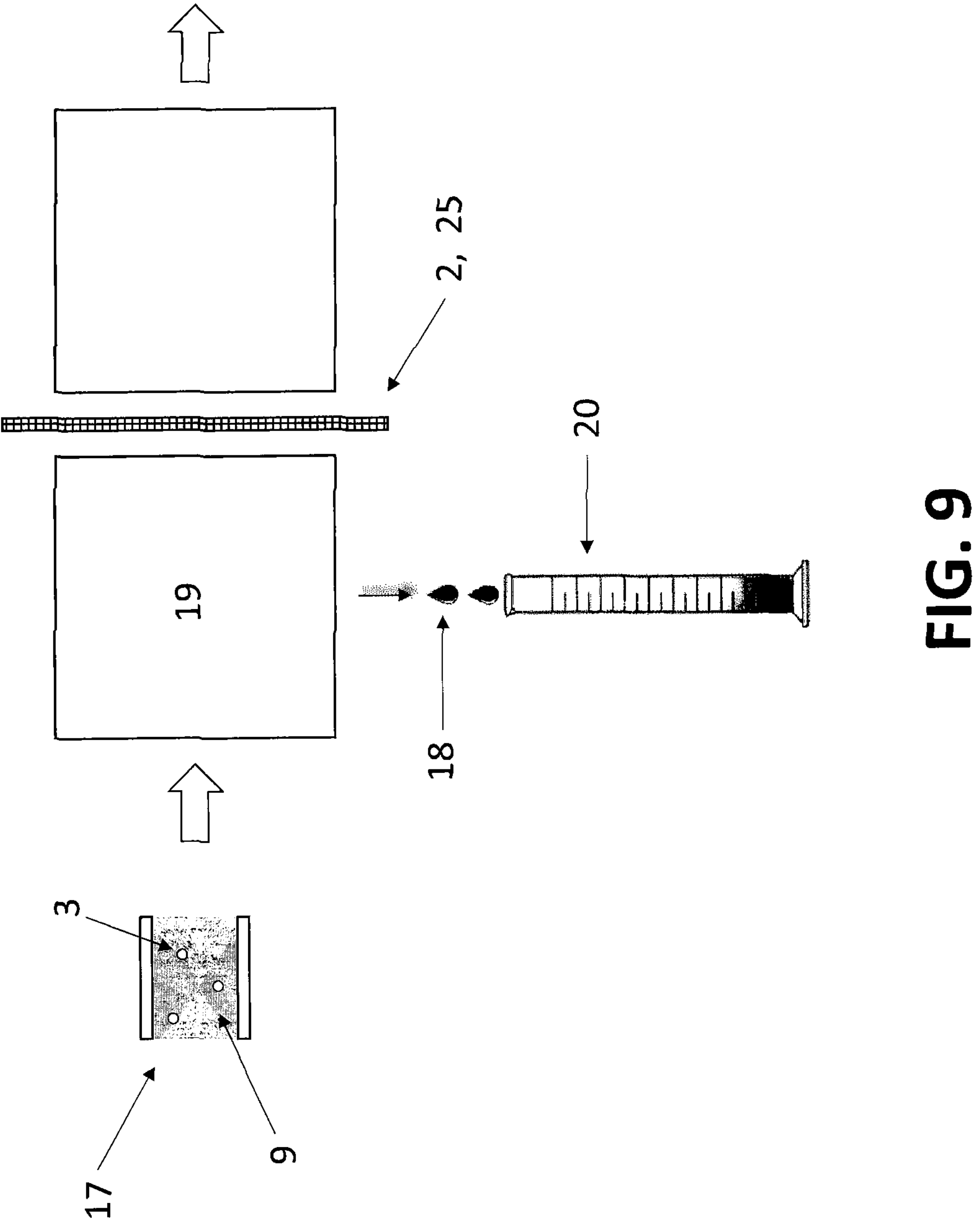
FIG. 9 schematically illustrates the test bench used to determine the separation efficiency of a water/diesel fabric.

FIG. 9 illustrates a diagram of a test bench for measuring the separation efficiency of the prior art fabric 2 and the fabric 25 according to the invention, calculated as a percentage ratio between the volume of water stopped by the filtering fabric and the total volume of water present in the water/diesel emulsion delivered towards the fabric.

The test is carried out according to the ISO16332 standard and entails the passage of an emulsion 17 of water 3 and diesel 9 through a filtering fabric 2,25. Water 18 separated in the stage 19 upstream of the fabric is collected in a suitable measuring device 20.

Figure 10:
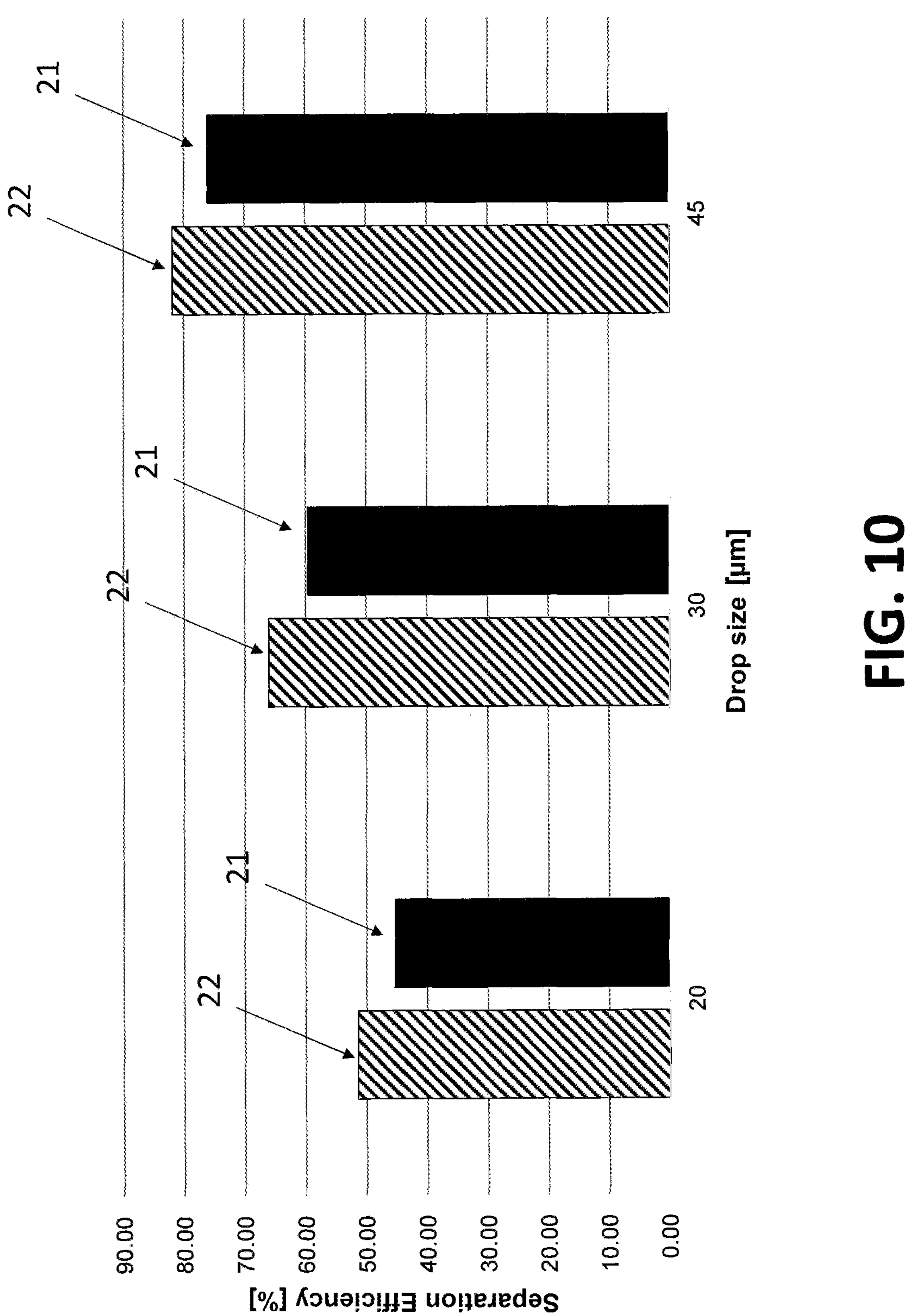
FIGS. 10 and 11 are graphs showing the results of the tests carried out with the test bench of FIG. 9.

The graphs given in FIG. 10 show the results of the tests performed on a prior art fabric 2 with square mesh and on the fabric 25 according to the invention with rectangular mesh.

In particular:

the prior art fabric 2 is formed of square mesh having size of 18×18 μm and a free surface of the mesh of 18%;

the fabric 25 according to the invention is formed of rectangular mesh having size of 15×20 μm and a free surface of the mesh of 22%.

The test was carried out at a specific water/diesel emulsion flow rate of 30 l/h on a sample of filtering fabric with surface of 9 $cm^2$ (specific flow rate of 3.33 l/h/$cm^2$), with varying dimensional distribution of the water drop.

The reference number 21 shows the separation efficiency value achieved by the square mesh fabric 2 of the prior art, whereas 22 shows the separation efficiency value of the rectangular mesh fabric 25 according to the invention.

The tests carried out show that:

for a drop distribution on a drop diameter of 20 μm, the separation efficiency is 45% for the prior art fabric 2 and 51% for the fabric 25 according to the invention;

for a drop distribution on a drop diameter of 30 μm, the separation efficiency is 59% for the prior art fabric 2 and 66% for the fabric 25 according to the invention;

for a drop distribution on a drop diameter of 45 μm, the separation efficiency is 78% for the prior art fabric 2 and 82% for the fabric 25 according to the invention.

Figure 11:
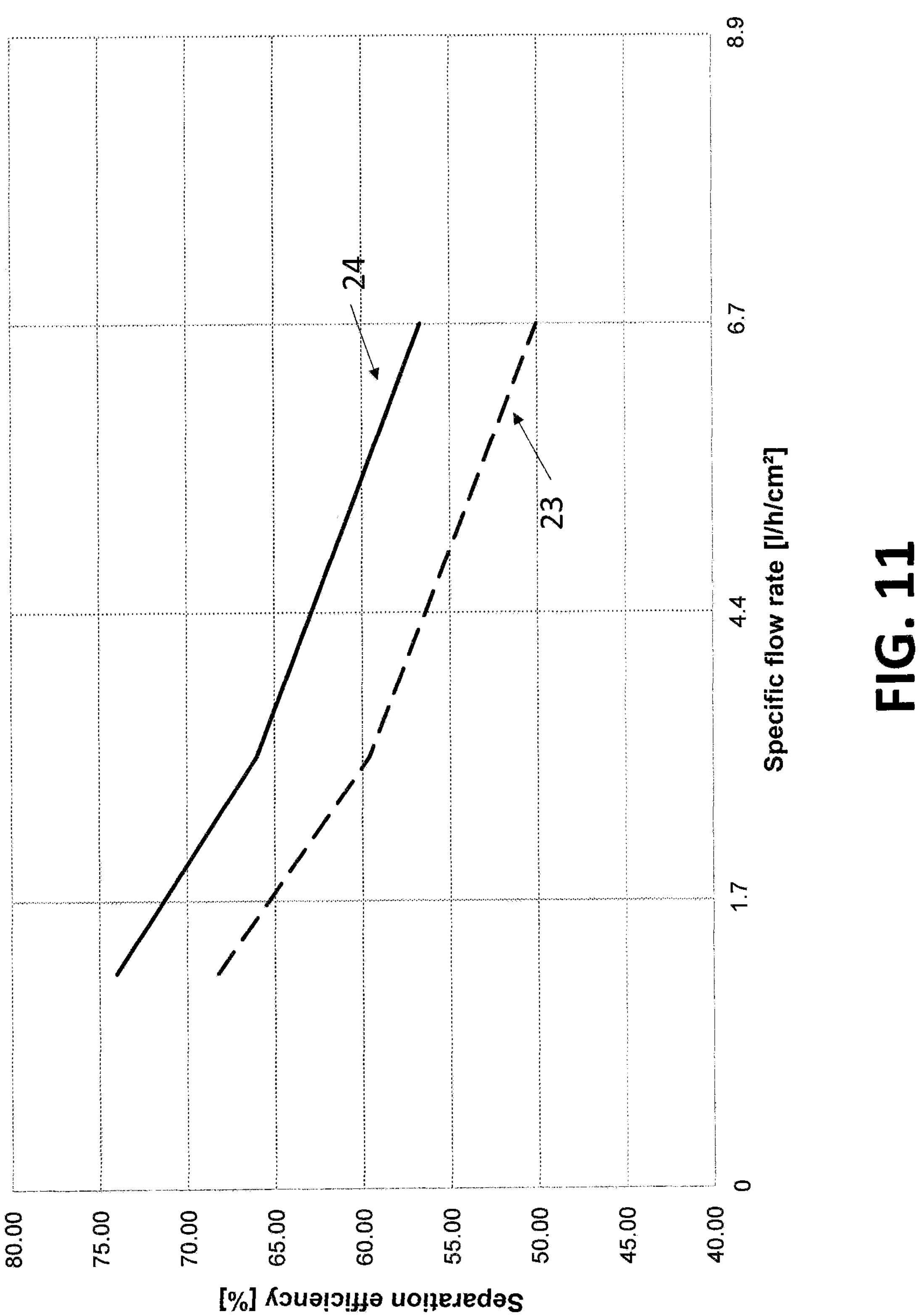

The graphs in FIG. 11 show the results of the tests carried out on a prior art square mesh fabric and a rectangular mesh fabric according to the invention, of the type already described with reference to the test in FIG. 10. This time the test was carried out maintaining the dimensional distribution of the water drops constant at a value of 30 μm, and varying the specific flow rate of the water/diesel emulsion instead. The reference number 23 shows the separation efficiency curve for the square mesh fabric 2, whereas 24 shows the separation efficiency curve obtained using the rectangular mesh fabric 25 according to the invention.

The tests show that:

for a specific flow rate of 1.7 l/h/$cm^2$ the separation efficiency is 68% for the prior art fabric 2 and 74% for the fabric 25 according to the invention;

for a specific flow rate of 6.7 l/h/$cm^2$ the separation efficiency is 50% for the prior art fabric 2 and 57% for the fabric 25 according to the invention.

With the same specific flow rate of the water/diesel emulsion entering the filter, the pressure drop on the fabric according to the invention is smaller than the pressure drop on the prior art fabric. In particular:

for a specific flow of 0.07 l/min $cm^2$, the fabric according to the invention provides a pressure drop of 1.70 kPa, whereas the prior art fabric provides a pressure drop of 1.98 kPa;

for a specific flow of 0.21 l/min $cm^2$, the fabric according to the invention provides a pressure drop of 3.92 kPa whereas the prior art fabric provides a pressure drop of 4.89 kPa.

Figure 12:
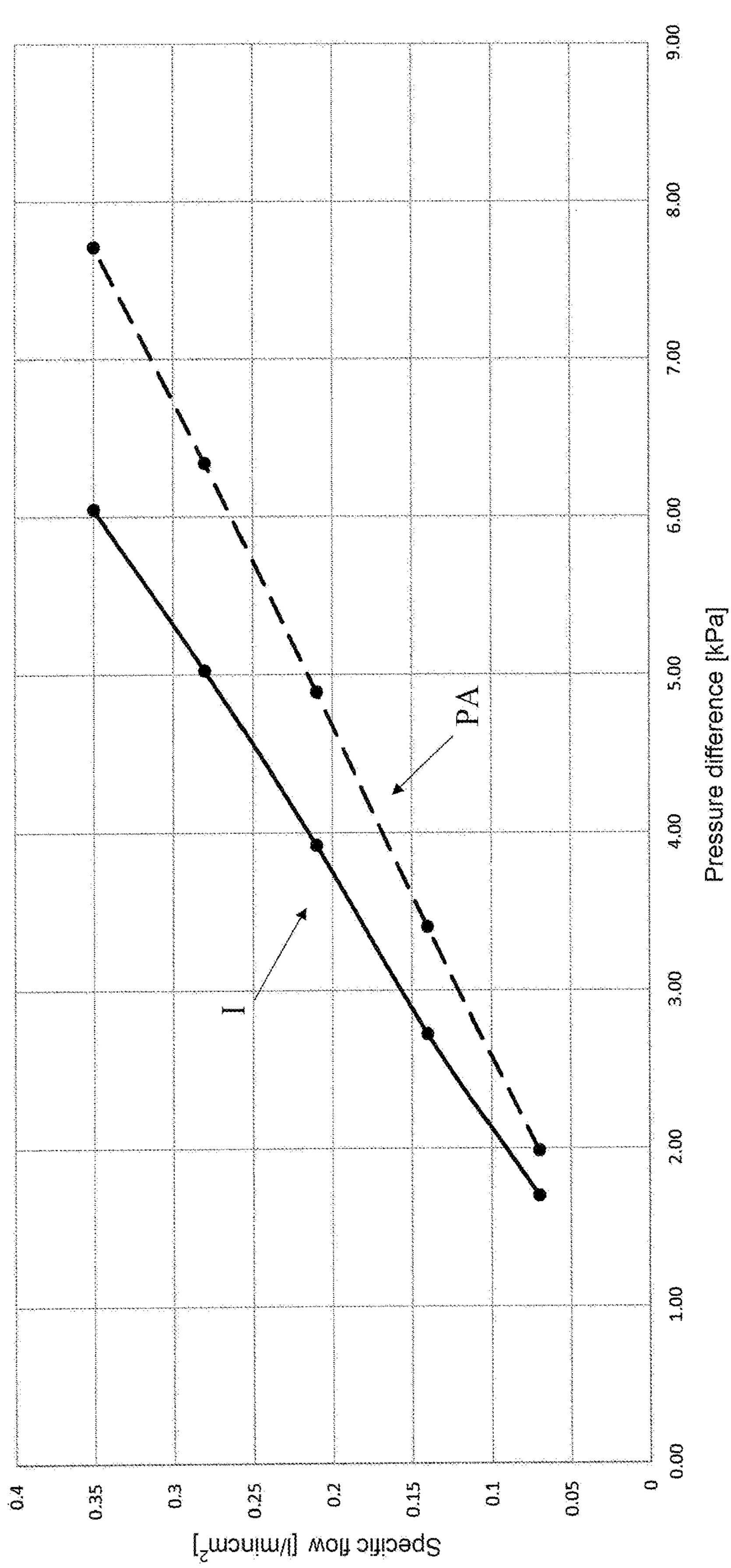
FIG. 12 is a graph that illustrates the relation between the specific flow of the emulsion and the pressure, for the prior art fabric and the fabric according to the invention, respectively.

FIG. 12 illustrates the trend of the cited specific flow/pressure curves, (I) for the rectangular mesh fabric according to the invention and (PA) for the prior art square mesh fabric, respectively.

The invention claimed is:

1. A water/diesel separating filter configured and arranged to separate water from a diesel flow, comprising a water/diesel emulsion, within an automotive diesel fuel filtering system, the filter comprising:

a body; and a filtering fabric housed within the body, wherein said filtering fabric comprises:

rectangular meshes, having sides that are formed by respective threads, wherein each of said rectangular meshes is comprised of a pair of shorter sides and a pair of longer sides, wherein said rectangular meshes are configured and arranged to stop water drops of the water/diesel emulsion, while allowing diesel of the water/diesel emulsion to pass through portions of said rectangular meshes left free by said water drops, wherein said rectangular meshes have a size ratio between the shorter side and the longer side that is greater than or equal to 0.38 and less than 1, and wherein when said meshes receive, from the diesel flow to be filtered, a water drop with a diameter greater than the length of the shorter side of said meshes, said water drop is retained on the meshes, while portions of said rectangular openings are formed for allowing the diesel flow to pass therethrough.

2. The water/diesel separating filter according to claim 1, wherein a range of the shorter side of the mesh is from 5 to 150 μm.

3. The water/diesel separating filter according to claim 1, wherein said threads are synthetic monofilaments or multi-filaments with a diameter of 10-90 μm.

4. The water/diesel separating filter according to claim 1, wherein said fabric has a number of threads per cm ranging from 23 to 350.

5. The water/diesel separating filter according to claim 1, wherein said threads are formed of a synthetic technopolymer belonging to the family of polyesters, polyamides, polyaryletherketones, polyparaphenylene sulfides, polypropylenes, perfluorocarbons, polyurethanes, or polyvinyl chlorides.

6. The water/diesel separating filter according to claim 1, wherein said threads are made of an artificial polymer belonging to the cellulose or viscose family or consist of a metal yarn.

7. The water/diesel separating filter according to claim 1, wherein said threads have a water-repellent coating.

8. The water/diesel separating filter according to claim 1, wherein the size of said mesh varies in one or both the weft and warp directions, wherein threads of different nature or different size are provided in combination or in the same direction or in the two different weft and warp directions.

9. The water/diesel separating filter according to claim 1, wherein the size ratio of said rectangular meshes is greater than or equal to 0.38 and less than or equal to 0.9.

10. The water/diesel separating filter according to claim 1, wherein the size ratio of said rectangular meshes is greater than or equal to 0.38 and less than or equal to 0.8.

11. The water/diesel separating filter according to claim 1, wherein the size ratio of said rectangular meshes is greater than or equal to 0.4 and less than or equal to 0.9.

12. The water/diesel separating filter according to claim 1, wherein the size ratio of said rectangular meshes is greater than or equal to 0.5 and less than or equal to 0.9.

13. The water/diesel separating filter according to claim 1, wherein the size ratio of said rectangular meshes is greater than or equal to 0.4 and less than or equal to 0.8.

14. The water/diesel separating filter according to claim 1, wherein the size ratio of said rectangular meshes is greater than or equal to 0.5 and less than or equal to 0.8.

15. A water/diesel separating filter configured and arranged to separate water from a diesel flow, comprising a water/diesel emulsion, within an automotive diesel fuel filtering system, the filter comprising:

a body; and a filtering fabric housed within the body, wherein said filtering fabric comprises:

rectangular meshes, having sides that are formed by respective threads, wherein each of said rectangular meshes is comprised of a pair of shorter sides and a pair of longer sides, wherein said rectangular meshes are configured and arranged to stop water drops of the water/diesel emulsion, while allowing diesel of the water/diesel emulsion to pass through portions of said rectangular meshes left free by said water drops, wherein said rectangular meshes have a size ratio between the shorter side and the longer side that is greater than or equal to 0.5 and less than 0.8, wherein a range of the shorter side of the mesh is from 5 to 150 μm, and wherein when said meshes receive, from the diesel flow to be filtered, a water drop with a diameter greater than the length of the shorter side of said meshes, said water drop is retained on the meshes, while portions of said rectangular openings are formed for allowing the diesel flow to pass therethrough.

16. A method of using a fabric in a filter for separating water from a diesel flow, comprising a water/diesel emulsion, in an automotive diesel fuel filtering system, wherein said fabric has rectangular meshes having sides that are formed by respective threads, wherein each of said rectangular meshes is comprised of a pair of shorter sides and a pair of longer sides, the method comprising:

using said rectangular meshes to stop water drops of the water/diesel emulsion, while allowing diesel of the water/diesel emulsion to pass through portions of said rectangular meshes left free by said water drops, and wherein said rectangular meshes have a size ratio between the shorter side and the longer side that is greater than or equal to 0.38 and less than 1, and wherein when said meshes receive, from the diesel flow to be filtered, a water drop with a diameter greater than the length of the shorter side of said meshes, said water drop is retained on the meshes, while portions of said rectangular openings are formed for allowing the diesel flow to pass therethrough.

17. The method according to claim 16, wherein said threads are formed of a synthetic technopolymer belonging to the family of polyesters, polyamides, polyaryletherketones, polyparaphenylene sulfides, polypropylenes, perfluorocarbons, polyurethanes, or polyvinyl chlorides.

18. The method according to claim 16, wherein said threads are made of an artificial polymer belonging to the cellulose or viscose family or consist of a metal yarn.

19. The method according to claim 16, wherein said threads have a water-repellent coating.

20. The method according to claim 16, wherein the size of said mesh varies in one or both the weft and warp directions, wherein threads of different nature or different size are provided in combination or in the same direction or in the two different weft and warp directions.

* * * * *